United States Patent [19]

Tsuchiya et al.

[11] Patent Number: 5,470,369
[45] Date of Patent: Nov. 28, 1995

[54] PROCESS FOR CONSOLIDATION OF POROUS PREFORM FOR OPTICAL FIBER

[75] Inventors: Ichiro Tsuchiya; Toshio Danzuka; Masumi Ito, all of Yokohama, Japan

[73] Assignee: Sumitomo Electric Industries, Ltd., Osaka, Japan

[21] Appl. No.: 197,534

[22] Filed: Feb. 16, 1994

Related U.S. Application Data

[63] Continuation of Ser. No. 990,256, Dec. 14, 1992, abandoned.

[30] Foreign Application Priority Data

Dec. 16, 1991 [JP] Japan .................. 3-332047

[51] Int. Cl.$^6$ .................................. C03B 37/018
[52] U.S. Cl. ............................... 65/379; 65/427
[58] Field of Search ................... 65/18.4, 375.15, 65/144, 18.1, 32.1, 18.2, 900, 2, 17.3, 379, 427, 416, 424

[56] References Cited

U.S. PATENT DOCUMENTS

| | | | |
|---|---|---|---|
| 4,961,767 | 10/1990 | Schermerhorn | 65/2 |
| 5,022,904 | 6/1991 | Ishiguro | 65/2 |
| 5,106,401 | 4/1992 | Ishikawa | 65/2 |
| 5,145,507 | 9/1992 | Kyoto | 65/2 |

FOREIGN PATENT DOCUMENTS

| | | | |
|---|---|---|---|
| 0195407 | 9/1986 | European Pat. Off. | |
| 0232815 | 8/1987 | European Pat. Off. | |
| 215537 | 10/1985 | Japan | 65/2 |
| 63-201025 | 8/1988 | Japan | |
| 1275441 | 11/1989 | Japan | |

OTHER PUBLICATIONS

Patent Abstracts of Japan, vol. 9, No. 233 (C–304) 19 Sep. 1985 *abstract* & JP-A-60 090 836 (Shinetsu Chem. Ind. Co., Ltd.) May 1985, pp. 208 and 209.
Chemical Abstracts, vol. 116, No. 12, Columbus, Ohio, US; abstract No. 112029m, *abstract* & JP-A-03-247 523 (Asahi Glass Co., Ltd.) 5 Nov. 1991, p. 134.
Chemical Abstracts, vol. 110, No. 6, Columbus, Ohio, US: abstract No. 043690g, *abstract* & JP-A-63 201 025 (Sumitomo Electric Ind. Ltd.), 19 Aug. 1988, pp. 117 and 118.
Patent Abstracts of Japan, vol. 13, No. 466 (C–646) 20 Oct. 1989 *abstract* & JP-A-01 183 430 (Sumitomo Electric Ind. Ltd.) 21 Jul. 1989, p. 199.
Patent Abstract of Japan, vol. 14, No. 43 (C–681) 26 Jan. 1990 *abstract* & JP-A-01 275 441 (Sumitomo Electric Ind. Ltd.), 6 Nov. 1989, pp. 221 and 222.
Patent Abstracts of Japan, vol. 5, No. 128 (C–067) 18 Aug. 1981 & JP-A-56 063 833 (NT&T Corp.) 30 May 1981.
Database WPIL, Section Ch, Week 26, Derwent Publications Ltd., London, GB; Class L01, AN 89–190672 & JP-A-01 131 033 (Fujikura Cable Works Co., Ltd.), 23 May 1989.
Patent Abstracts of Japan, vol. 16, No. 71 (C–913) 21 Feb. 1992 & JP-A-03 265 533 (Fujikura Ltd.) 26 Nov. 1991.
Patent Abstracts of Japan, vol. 14, No. 215 (C–716) 8 May 1990 & JP-A-02 051 436 (Fujikura Ltd.) 21 Feb. 1990.

*Primary Examiner*—W. Gary Jones
*Assistant Examiner*—John Hoffmann
*Attorney, Agent, or Firm*—Cushman Darby & Cushman

[57] ABSTRACT

There is provided a process for the consolidation of a porous glass preform for an optical fiber by heating the preform under an increasing pattern of a heating temperature in a vacuum furnace comprising a muffle tube therein characterized in that the increasing pattern is divided into two steps consisting of a first step and a second step with regard to time, and the first step has a pattern in which the heating temperature is increased under a reduced pressure atmosphere and a gas comprising at least an inert gas is supplied to the vacuum furnace under the reduced pressure atmosphere and the second step has a pattern in which the heating temperature is increased under a reduced pressure atmosphere in which a gas comprising a smaller amount of an inert gas than that of the first step is supplied to the vacuum furnace or under a vacuum pressure atmosphere in which no gas is supplied to the vacuum furnace.

16 Claims, 2 Drawing Sheets

PROCESS FOR CONSOLIDATION OF POROUS PREFORM FOR OPTICAL FIBER

This is a continuation of application Ser. No. 07/990,256, filed on Dec. 14, 1992, which was abandoned upon the filing hereof.

BACKGROUND OF THE INVENTION

1. Field of the Invention

The present invention relates to a process for consolidation of a porous preform for an optical fiber by heating the preform. In particular, the present invention relates to an improved process for the consolidation of a porous glass preform in which the preform is heated in an atmosphere comprising a reduced pressure or a vacuum pressure so that a consolidated preform having less and impurities is stably produced over an extended period whereby an optical fiber having a good transmission properties can be produced from the consolidated preform.

2. Description of the Related Art

A glass preform comprising fine glass particles produced by the Vapor Deposition Method such as the Vapor Phase Axial Deposition (VAD) Method or the Outside Vapor Deposition (OVD) Method is heated to an elevated temperature in an electrical furnace so that it is consolidated to be a glass article. Conventionally, such a consolidation process is carried out by traversing the preform across a narrow heating zone at a normal pressure under an atmosphere comprising an inert gas such as He (helium) optionally containing a slight amount of a halogen (particularly chlorine) gas. The process may be referred to as the Zone Heating Process. Alternatively, the preform is consolidated by placing it in an electrical furnace having a large heating space enough to heat the whole preform uniformly and increasing a furnace temperature gradually. The process may be referred to as the Temperature Holding Process.

A problem in the conventional consolidation processes as described above, there is a problem during the heating consolidation treatment of the preform that voids (which will be, herein, referred to as "bubbles") are left in a produced glass article. Such bubbles are generated from gases originally confined between the fine glass particles and/or dissolved in the glass particles during the consolidation. In addition, the bubbles may be sometimes produced during a process at a high temperature after the consolidation. Japanese Patent Kokai Publication Nos. 201025/1988 and 275441/1989 propose processes for the consolidation of the preform under a reduced pressure or a vacuum pressure. In these processes, it can be expected that nearly no gas (thus, bubble) remains in the resulted glass article because the reduced or the vacuum atmosphere removes the gases in the porous preform for the optical fiber. The term "reduced pressure" herein used is intended to mean a pressure less than 5 kPa. The term "vacuum pressure" herein used is intended to mean a pressure less than 5 Pa without gas supply nor evacuation rate control.

One example of an apparatus is shown in FIG. 2 which can be used in the conventional process for the consolidation of the preform for the optical fiber under the reduced pressure or the vacuum pressure. In FIG. 2, the numerical number 31 indicates a furnace body (or a pressure vessel), 32 does a muffle tube, 33 does a heater, 34 does a heat shield 35 does a gas inlet, 36 does a gas outlet and 37 does a vacuum pump.

When a porous preform 38 for an optical fiber is consolidated, it is held in the muffle tube 32 and heated to a temperature not higher than 1700° C. while the furnace body 31 is maintained at a vacuum pressure by evacuating the furnace body using the vacuum pump 37. Optionally, any required gas can be added in and withdrawn from the pressure vessel 31 through the inlet 35 and the outlet 36 with using the vacuum pump 37.

Some relationships between a gas supply to the furnace, a gas evacuation from the furnace and a heating temperature increasing rate pattern are disclosed for the consolidation using the above apparatus.

Examples of the relationships described in Japanese Patent Kokai Publication No. 201025/1988 are shown as follows:

| | (1) Consolidation process under vacuum pressure: | |
|---|---|---|
| Temperature: | From R.T.* to 1000° C. *(Room Temperature) | From 1000° C. to 1600° C. |
| Temp. Increasing Rate: | 20° C./min. | 5° C./min. |
| Pressure: | <0.65 Pa | <1.3 Pa (without evacuation rate control) |
| Gas Supply: | Non | Non |
| | (2) Consolidation process under reduced pressure: | |
| Temperature: | From R.T. to 1000° C. | From 1000° C. to 1600° C. |
| Temp. Increasing Rate: | 20° C./min. | 5° C./min. |
| Pressure: | 13 Pa | 13 Pa (with evacuation rate control) |
| Gas Supply: | Ar 10 scc*/min. *(standard cubic centimeter) | Ar 10 scc/min. |

Other examples of the relationship as described in Japanese Patent Kokai Publication No. 275441/1989 are shown as follows:

| | (3): |
|---|---|
| Temperature: | From R.T. to 1600° |
| Temperature Increasing Rate: | 8° C./min. |

-continued

| | | |
|---|---|---|
| Pressure: | 10 Pa (with evacuation rate control) | |
| Gas Supply: | He 200 scc/min. | |
| (4): | | |
| Temperature: | From R.T. to 1000° C. | From 1000° C. to 1600° C. |
| Temp. Increasing Rate: | 6° C./min. | 8° C./min. |
| Pressure: | 10 Pa | 10 Pa (with evacuation rate control) |
| Gas Supply: | Cl$_2$ 100 scc/min. | He 100 scc/min. |

In each of the processes in which the above relationships (2), (3) and (4) are carried out, the gas was supplied to the inside of the muffle tube.

In the process in which the conventional apparatus is used for the consolidation, a certain amount of a gas is supplied to the furnace while a evacuation rate of the gas from the furnace is controlled in order that the pressure in the furnace is maintained constant.

However, the preform before being thermally treated includes and/or adsorbs a large amount of water and oxygen therein, which are liberated into the inside of the furnace when the preform is thermally treated, whereby carbon material which is often used for the muffle tube, the heater and also the heat shield of the heater is exhausted due to oxidation caused by water and oxygen. In addition, members constituting the furnace which are made of a stainless steel material are also oxidized and degraded.

Such oxidation and/or degradation may not be a problem if the furnace is only used for a short period of time, but there arise the following problems when the furnace is used for the vitrification of a number of the preforms over a long period of time:

a. The exhausted carbon members must be replaced;

b. Powder which is generated on the exhaustion of the carbon material may attach to the glass preform, which causes bubble generation in the preform;

c. When the furnace is degraded due to the oxidation, the rust may fall down in the muffle tube and be mixed into the preform, which inversely affects the transmission properties of the optical fiber which is produced from the preform; and d. In connection with the above "c", removal of the rust must be often carried out very carefully.

In addition, when the glass preform for the optical fiber is dehydrated using a halogen gas or a halide gas, a product gas is generated by a reaction of the halogen gas or the halide gas with water liberated from the preform. For example, when the halogen gas is chlorine gas, hypochlorous acid is generated. Oxidation of the carbon material or the stainless steel material is enhanced by such a product gas compared with the case in which only water is present. This problem is very critical when the halogen gas or the halide gas is used.

SUMMARY OF THE INVENTION

In view point of the above problems, it is an object of the present invention to provide a process for the consolidation of a porous glass preform for an optical fiber in which a number of the porous glass preforms for an optical fiber are stably consolidated over a long period of time by heating the preform.

According to the present invention, there is provided a process for the consolidation of a porous glass preform for an optical fiber by heating the preform under an increasing pattern of a temperature in a vacuum furnace comprising a muffle tube characterized in that the increasing pattern is divided into two steps comprising a first step and a second step with regard to time, and the first step has a pattern in which the temperature is increased under a reduced pressure atmosphere and a gas comprising at least an inert gas is supplied to the vacuum furnace and the second step has a pattern in which the temperature is increased under a reduced pressure atmosphere in which a gas comprising a smaller amount of an inert gas than that of the first step is supplied to the vacuum furnace or under a vacuum pressure atmosphere in which no gas is supplied to the vacuum furnace.

In the present invention, the terms "reduced pressure" and "vacuum pressure" are intended to mean the same pressure range, gas supply and evacuation rate control as described in "Description of the Related Art". Difference between "reduced pressure" and "vacuum pressure" is not so strict, and thus, they may overlap each other partially. Further, the increasing pattern of the temperature in each step is preferably programmed. For example, the temperature is programmed to increase by some degrees centigrade per minute.

DETAILED DESCRIPTION OF THE INVENTION

Figure 1:
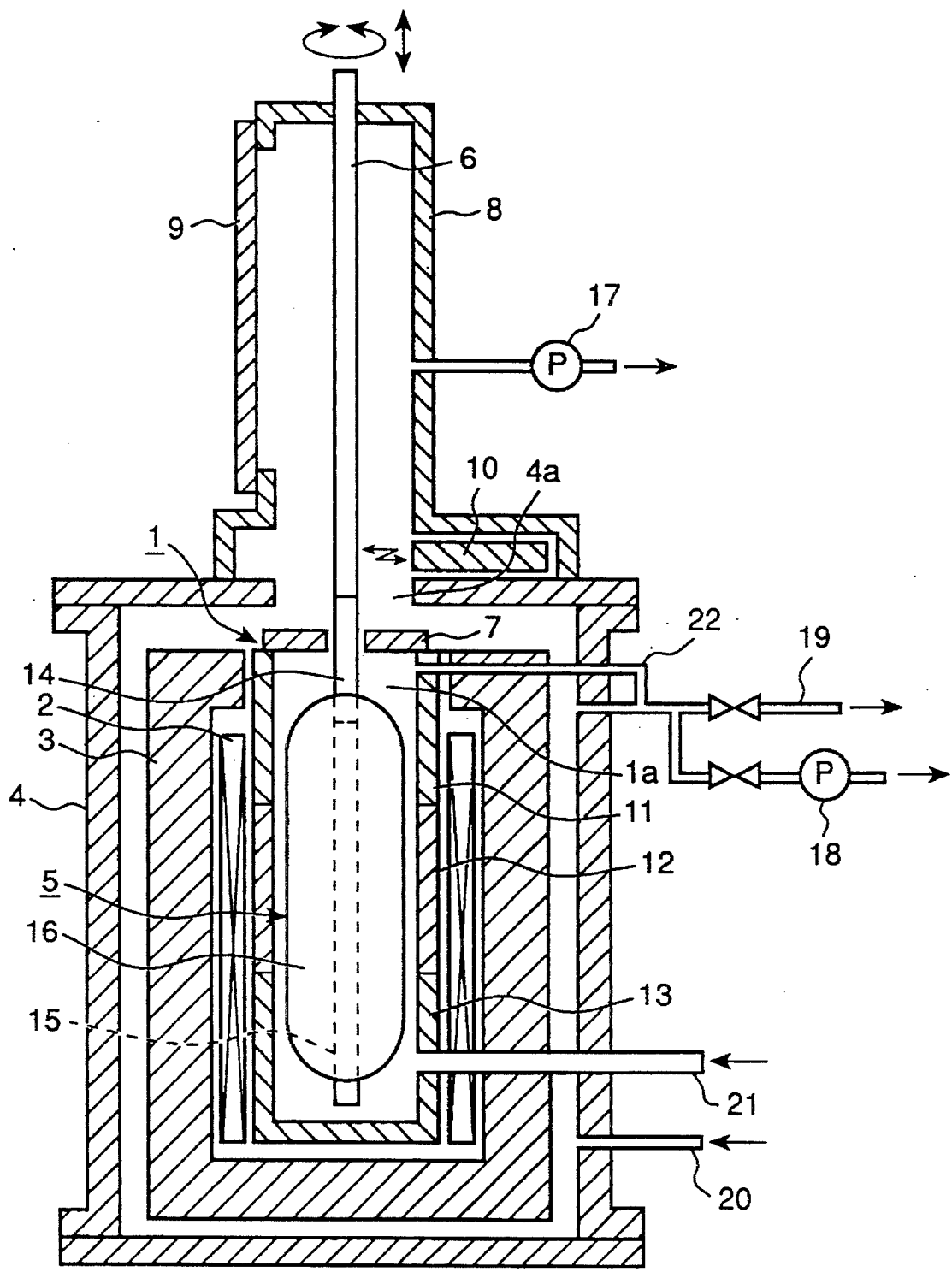
FIG. 1 schematically shows an apparatus for the process for the heating consolidation of the preform according to the present invention.
Figure 2:
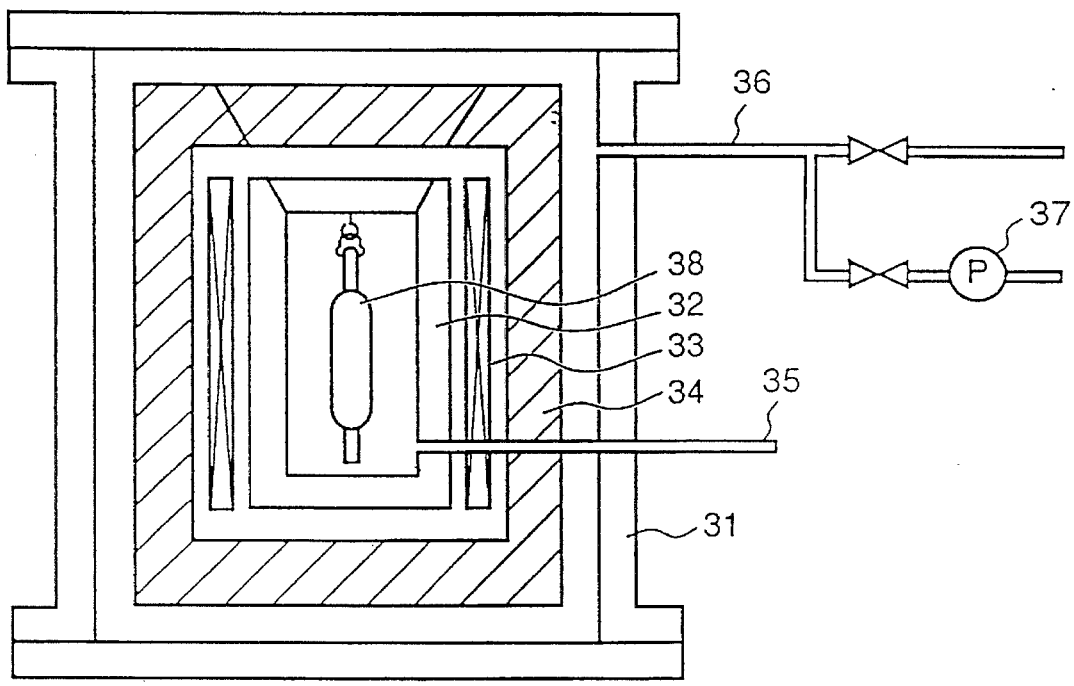
FIG. 2 schematically shows an apparatus for the process for the conventional consolidation of the preform.

The present invention will be, hereinafter, described in detail.

According to the present invention, in the first step of the increasing pattern of the heating temperature, the porous glass preform for the optical fiber (hereinafter, often referred to as merely "preform") is heated while gases which have been adsorbed to or included in the preform are liberated therefrom. In the second step of the increasing pattern of the heating temperature, the preform is consolidated. A boundary temperature between the first step and the second step is preferably set in the range between about 1100° and about 1450° C.

The boundary between the first step and the second step is not necessarily an instantaneous period, but it may be a certain period of time and the gas supply to the vacuum furnace may be reduced continuously and gradually or stepwise during such a period of time.

It is a purpose of the first step that oxygen and water be removed from the preform liberated into the inside of the furnace and surfaces of furnace members and remain in the furnace. During the first step, pressure in the vacuum furnace is preferably not less than 20 Pa, more preferably not less than 50 Pa, and preferably not more than 5 kPa, more preferably not more than 1 kPa, for example about 100 Pa.

In order to evacuate the liberated gas from the vacuum furnace as soon as possible, it is preferable not to control (or adjust) an evacuation capacity of an evacuating means such as a vacuum pump but to evacuate at a maximum capacity of the evacuating means and control a flow rate of the supplied gas to achieve the above pressure.

When the first step is carried out, it is not critical whether the pressure in the furnace is controlled to be constant by using supply gas flow rate control or the gas flow rate is made constant.

According to the present invention, the flow rate of the gas supply to the furnace is preferably selected such that a pressure in the furnace at which the present process is to be carried out is about five times or more as large as a pressure in the furnace when a preform which is the same as the preform to be consolidated is heated under the same increasing temperature rate pattern as in that of the practice of the present process except that no gas is supplied. The pressure has an upper limit of 5 kPa. Any pressure below the limitation may be selected under consideration of a gas consumption cost.

Helium is the most preferable gas which is supplied to the furnace in the first step since it induces no bubble problem and, thus, no inverse effect on transmission properties of the optical fiber are produced from the resultant preform.

When a required amount of He is supplied fully to the inside of the muffle tube, it flows at a very high speed under a pressure near the vacuum pressure, so that the glass preform may be broken by the high speed He. Thus, He is preferably supplied to the outside of the muffle tube in the vacuum furnace or only a portion of He is supplied to the inside of the muffle tube and the balance is supplied to the outside of the muffle tube.

In the second step, there is almost no gas liberated from the preform. At that time, if the pressure in the furnace is high, bubbles are likely to be generated in the consolidated preform. Therefore, it is preferred that the consolidation is carried out with the gas flow rate being smaller than that of the first step or with no supply of the gas.

The pressure in the furnace during the second step is preferably less than 100 Pa. As in the first step, the gas evacuation capacity is preferably not controlled.

When a preform for a core of a single mode optical fiber is thermally treated, a halogen gas or a halide gas such as chlorine gas, $SiCl_4$ gas or $CCl_4$ gas is sometimes used in combination with He gas so that dehydration of the preform is also carried out. In such a case, the halogen gas or the halide gas is preferably supplied only during a certain period of the first step since such a gas enhances the oxidation and the degradation of the furnace body and the muffle tube as described above.

Thus, the halogen gas or the halide gas supply is limited to a certain period wherein a temperature is available which is sufficient to dehydrate the preform with the halogen gas or the halide gas and which is below a temperature at which the preform shrinks so that the halogen gas or the halide gas is not included in the preform. The halogen gas or the halide gas supply is preferably carried out at a temperature in a range between 1000° C. and 1200° C. depending on the increasing temperature rate pattern.

When the halogen gas or the halide gas is supplied, a partial pressure of the halogen gas or the halide gas in the furnace is preferably kept not lower than a certain pressure. The partial pressure is, for example, not lower than 200 Pa and not higher than 5 kPa. In order to increase a ratio of the reacted halogen gas or halide gas, the gas evacuation capacity from the vacuum furnace is preferably controlled.

However, it should be noted that the rest of the first step and the second step are preferably carried out with a maximum gas evacuation capacity, namely, without any evacuation control.

In order that the halogen gas or the halide gas is supplied to the circumference of the preform as much as possible and is supplied to the outside of the muffle tube as little as possible, it is preferable that the halogen gas or the halide gas is supplied to only the inside of the muffle tube and He is supplied to the outside of the muffle tube of the vacuum furnace, or a portion of He is supplied to the inside of the muffle tube and the rest is supplied to the outside of the muffle tube.

The functions and the effects of the present heating consolidation for the preform will be explained below.

(1) In the first step, the oxidation and/or the degradation of the carbon made members in the furnace body and the oxidation and/or the rusting of the stainless steel members in the furnace body both due to the water and the oxygen attaching to the preform and the furnace members are suppressed.

Reasons for which the above effect is obtained are shown as follows (i) to (v):

(i) In the muffle tube, a gas flow becomes a viscous flow under a pressure above 5 Pa. In such a pressure region, a conductance is proportional to a pressure and an amount of an evacuated gas amount Q can be expressed by an equation:

$$Q \propto \bar{P} (P_f - R_p)$$

wherein $P_f$ is a pressure in the furnace, $P_p$ is a pressure at an inlet of a vacuum pump and $\bar{P}=(P_f+P_p)/2$. Since the larger $P_f$ is, the larger $P_f-P_p$ becomes, the evacuated amount is, as a result, increased above a proportional ratio. This means that the higher the pressure is, the shorter a residence time of produced gases such as water (moisture) and oxygen in the furnace is, and thus, the possibility of the reaction of the gas with the carbon members and the furnace body is reduced. When the evacuation capacity is controlled (or limited) in order to increase the furnace pressure, this effect is not obtained and the residence time of the produced gases becomes longer, which causes an inverse effect.

(ii) Considering an evacuation rate and a pressure of a vacuum evacuation system, the higher a pressure is, the larger an evacuation volume rate Qr ($Qr=Q/\bar{P}$) is in a pressure range up to a pressure of about 100 Pa in an evacuation system. Preferably, the present process such as an evacuation system comprising a rotary pump and an evacuation system comprising a mechanical booster pump and a rotary pump are used.

The evacuation system comprising the rotary pump has the same tendency in a pressure range of 100 Pa to 5 kPa as in the pressure range up to about 100 Pa. With this effect, the residence time of the produced gas in the furnace is reduced as in the above (i), so that possibility of the reactions of the produced gases and the carbon members and the furnace body is decreased.

In an evacuation system comprising the mechanical booster pump, the evacuation rate is reduced when the pressure is above 100 Pa so that the above effect is not obtained.

(iii) When the gas flow is changed from a molecular flow to the viscous flow, a gas flow from the inside of the furnace to an exhaust line occurs. Thus, the produced gases are more likely evacuated without contact with the carbon members and the furnace body.

(iv) From a view point of the reactions of the carbon members and the stainless steel members with the product gas, the possibility of such reactions is reduced when an amount of the product gas attaching to surfaces of the members is small. Therefore, by increasing a partial pressure of an inert gas in the furnace, the amount of the inert gas attaching to the surfaces is increased and thus the reactions of the produced moisture and oxygen gas with the carbon members and the stainless steel members are suppressed.

(v) By supplying the inert gas mainly to the outside of the muffle tube, a produced gas flow from the inside of the muffle tube to the outside of the muffle tube is prevented, whereby the reactions of the carbon and the stainless steel with the produced gases are suppressed.

(2) In the second step, the inert gas is not supplied or the amount of the inert gas supply is reduced so that gas consumption is saved and also the generation of the bubbles in the preform is prevented. In the other words, since one of the causes which induce the bubbles in the preform is the remaining gas in the preform during the consolidation, it is very effective for the prevention of the bubble generation to decrease the gas flow rate in the furnace to reduce the pressure in the furnace.

Another cause which induces the bubbles is the deposition of the carbon powder on the preform which is generated by the degradation of the carbon made members during the consolidation step. When the pressure in the furnace is reduced and the gas flow rate is reduced, optionally to zero, the carbon powder is prevented from floating in the furnace with the gas flow so that the generation of the bubbles is suppressed.

(3) Because He is most unlikely to produce the bubbles in the preform, He is used as the inert gas, which is also described in Japanese Patent Kokai Publication No. 201025/1988.

(4) Even though the halogen gas or the halide gas is used, the degradation and the oxidation of the carbon made members and the stainless steel made members due to the product gas from the reaction between the halogen gas or the halide gas and the water (for example, hypochlorous acid gas when chlorine gas is used as the halogen gas), are minimized by optimizing the pressure condition for the dehydration of the preform by controlling the evacuation capacity and by limiting the heating temperature within a temperature range effective for the dehydration of the preform.

PREFERRED EMBODIMENT OF THE INVENTION

One preferred embodiment of the present invention will be, hereinafter, described with reference to the accompanying drawing.

FIG. 1 schematically shows one embodiment of the heating apparatus which is suitable for the practice of the present process for the heating consolidation of the preform.

Referring to FIG. 1, a muffle tube 1 is placed in a furnace body 4 being surrounded by a heater 2 and a heat shield 3. A porous preform 5 is held in the muffle tube 1 through a supporting rod 6, and an upper opening 1a of the muffle tube 1 is covered with an upper cover 7. An opening 4a is provided on the top of the furnace body 4 which corresponds to the upper opening 1a of the muffle tube 1. A front chamber 8 is provided on the furnace body 4 and is communicated with the muffle tube 1 through the opening 4a. The front chamber 8 includes a door 9 which is used when the preform is inserted in or removed from the front chamber. A gate valve (partition means) 10 is provided between the front chamber 8 and the muffle tube 1 in order to open or close the opening 4a.

The muffle tube 1 is made of highly pure carbon and constructed by assembling an upper portion 11, a middle portion 12 and a lower portion 13.

The porous preform 5 comprises a seed rod 14 which is attached to the tip of the supporting rod 6, a glass core 15 which is attached to the tip of the seed rod 14 and a porous glass layer 16 which is provided around the glass core 15.

The embodiment in FIG. 1 shows a case in which a preform is consolidated to produce a peripheral portion of the optical fiber from the preform. The porous preform 5 comprises a porous glass body without the glass core 5 which is wholly made of the porous glass and is attached to the tip of the seed rod 14 when a center portion of the optical fiber is finally produced from the preform.

In FIG. 1, the numerical number 17 indicates a front chamber evacuation pump which is communicated with the front chamber 8, 18 is a furnace body evacuation pump, 19 is an outlet line from the furnace body to a normal pressure, 20 is a gas supply inlet to the furnace body, 21 is a gas supply inlet to the muffle tube, and 22 does a glass made gas outlet from the muffle tube.

Since the apparatus shown in FIG. 1 comprises the front chamber which can be evacuated to a vacuum (reduced) pressure separately from the muffle tube, the heating consolidation of the preform can be started from conditions of a temperature in a range of 500° to 1000° C. under a vacuum pressure by placing the preform in the front chamber, evacuating the front chamber to the vacuum pressure while the gate valve 10 is closed and the muffle tube is kept at such an elevated temperature, and then inserting the preform into the muffle tube after opening the gate valve. Namely, the temperature in the muffle tube does not have to be reduced to a room temperature on every completion of the consolidation since a space defined by the front chamber and a space defined by the muffle tube are separated by the gate valve, and, thus, only a temperature of the front chamber has to be reduced while the temperature is kept high in the muffle tube.

The present invention will be, hereinafter, described with reference to following Examples. In each Example described below, the was started from conditions of the temperature of 800° C. and the vacuum pressure.

EXAMPLES

Example 1

Using the apparatus as shown in FIG. 1, fifteen porous preforms each for the peripheral portion of the optical fiber were consolidated by heating them under following conditions:

|  | First Step | Second Step |
| --- | --- | --- |
| Temperature: | From 800° C. to 1300° C. | From 1300° C. to 1600° C. |

|  | First Step | Second Step |
| --- | --- | --- |
| Temp. Increasing Rate: | 6° C./min. | 5° C./min. |
| Pressure: | about 90 Pa | From 0.5 to 1.5 Pa |
|  | (without evacuation control throughout first and second steps) | |
| Gas Supply: | He 3 SLM* *(Standard Liter/min.) (All He was supplied to outside, of muffle tube) | Non |

After the consolidation of the fifteen preforms, a weight loss of the muffle tube was measured and found to be 2 g. This weight loss seems to be caused by the degradation and the oxidation of the highly pure graphite (carbon) members which constitute the muffle tube due to the water and the oxygen adsorbed by the preforms.

The resultant consolidated preforms included no bubbles therein.

Comparative Example 1

Example 1 was repeated except that He was not used. Namely the conditions for the consolidation were as follows:

|  | First Step | Second Step |
| --- | --- | --- |
| Temperature: | From 800° C. to 1300° C. | From 1300° C. to 1600° C. |
| Temp. Increasing Rate: | 6° C./min. | 5° C./min. |
| Pressure Range: | From 1.5 to 12 Pa | From 0.5 to 1.5 Pa |
|  | (without evacuation control throughout first and second steps) | |
| Gas Supply: | Non | Non |

The weight loss of the muffle tube was measured to be 8 g after the consolidation of the fifteen preforms. Namely, the oxidation and degradation rate in Comparative Example 1 was four times as large as that of Example 1.

The resultant preforms included no bubbles therein.

When the heating temperature was 1300° C., the pressure was reduced to about 1.5 Pa, which probably means that liberation of the gases adsorbed by the glass preform had been almost finished by that time.

Comparative Example 2

Example 1 was repeated except that a small amount of He was supplied and the pressure in the furnace was kept constant by controlling the evacuation rate. The operation conditions are as follows:

|  | First Step | Second Step |
| --- | --- | --- |
| Temperature: | From 800° C. to 1300° C. | From 1300° C. to 1600° C. |
| Temp. Increasing Rate: | 6° C./min. | 5° C./min. |
| Pressure: | 100 Pa ± 5 Pa | From 0.5 to 1.5 Pa |
|  | (with evacuation rate control up to 1300° C. and without evacuation rate control thereafter) | |
| Gas Supply | He 300 scc/min. (All He was supplied to outside of muffle tube) | Non |

After the consolidation of fifteen preforms, the weight loss of the muffle tube was measured and found to be 7 g, which means that the degradation and oxidation rate was so fast as that of Comparative Example 1.

The resultant preforms included no bubbles therein.

Comparative Example 3

This Example was carried out in order to determine effects of gas species, a gas pressure and a gas supply temperature. The operation conditions are as follows:

|  | First Step | Second Step |
| --- | --- | --- |
| Temperature: | From 800° C. to 1300° C. | From 1300° C. to 1600° C. |
| Temp. Increasing Rate: | 6° C./min. | 5° C./min. |
| Pressure: | 300 Pa ± 5 Pa (with evacuation rate control) | 300 Pa ± 5 Pa |
| Gas Supply: | Ar 500 scc/min. | Ar 500 scc/min. |
|  | (gas was supplied to outside of muffle tube) | |

The resulted consolidated preforms included several tens of fine bubbles therein.

When the gas supply was changed to He in the above Comparative Example 3, the generation of the bubbles was not observed.

When the gas supply of Ar was stopped at a temperature of 1300° C., two fine bubbles were observed in the preform.

When the gas supply of Ar was set to 300 scc/min. at a temperature above 1300° C. and the gas evacuation control was not carried out (namely, with the maximum evacuation rate), the pressure in the furnace was 25 Pa. The preform produced under these conditions included two fine bubbles therein.

It is understood from the above series of the experiments that He is preferable as the gas supply and the gas supply is preferably reduced or stopped at a temperature above 1300° C.

Example 2

The porous glass preforms for the center portion of the optical fiber were consolidated by heating them under following conditions:

|  | First Step | Second Step |
| --- | --- | --- |
| Temperature: | From 800° C. to 1300° C. | From 1300° C. to 1600° C. |
| Temp. Increasing Rate: | 6° C./min. | 5° C./min. |
| Pressure: | 300 Pa ± 5 Pa | From 0.5 to 2 Pa |
| Gas Supply: | | |
| Muffle Tube Inside | Cl$_2$ 200 scc/min. | Non |
| Muffle Tube Outside | He 500 scc/min. | Non |
| (with evacuation rate control up to 1300° C. and without evacuation rate control thereafter) | | |

The resultant consolidated preforms included no bubbles therein.

Optical fibers were produced from the resulted preforms and the transmission loss of the optical fiber was measured at a wavelength of 1.55 μm and found to be less than 0.22 dB/km which is very good.

The weight loss of the muffle tube after the consolidation of fifteen preforms was 11 g.

Example 3

Example 2 was repeated under the following conditions:

| | First Step | | |
| --- | --- | --- | --- |
| Temperature: | From 800° C. to | 1100° C. | From 1100° C. to |
| | 1100° C. | | 1300° C. |
| Temp. Increasing Rate: | 6° C./min. | 0 (for 30 min.) | 6° C./min. |
| Pressure: | about 90 Pa | 300 Pa ± 5 Pa | about 90 Pa |
| Gas Supply: | | | |
| Muffle Tube Inside | Non | Cl$_2$ 200 scc/min. | Non |
| Muffle Tube Outside | He 3 SLM | He 500 scc/min. | He 3 SLM |
| | Second Step | | |
| Temperature: | From 1300° C. to 1600° C. | | |
| Temp. Increasing Rate: | 5° C./min. | | |
| Pressure: | From 0.5 to 2 Pa | | |
| Gas Supply: | | | |
| Muffle Tube Inside | Non | | |
| Muffle Tube Outside | Non | | |
| (with evacuation rate control at temperature of 1100° C. and without evacuation rate control at other temperature) | | | |

The resultant consolidated preforms included no bubbles therein.

Optical fibers were produced from the resulted preforms and the transmission loss of the optical fiber was measured at a wavelength of 1.55 μm and found to be less than 0.22 dB/km which is very good.

The weight loss of the muffle tube after the consolidation of the fifteen preforms was 6 g.

It is understood from the above results that, in the case in which the halogen gas or the halide gas is supplied, the weight loss of the muffle tube is reduced by supplying the gas only during the first step, preferably for a certain period of the first step and controlling the evacuation rate from the furnace only such a period of time and not controlling the evacuation rate from the furnace after the period of time.

As described with reference to the above Examples, according to the present invention, the degradation and the oxidation of the carbon members in the furnace induced by the water and the oxygen adsorbed in the preform and also by the product gas of the reaction of the water with the halogen gas or the halide gas are suppressed.

In addition, the gas supply is saved and the generation of the bubbles is prevented during the second step.

Further, the prevention of the degradation and the oxidation of carbon material in the furnace extends a life of the furnace. Also, the oxidation and the rusting of the stainless steel made members which constitute the furnace is prevented, which reduces the maintenance of the furnace and simplifies the maintenance of the furnace.

What is claimed is:

1. The process for the consolidation of a porous glass preform for an optical fiber comprising the steps of:
    a first step of heating the preform under an increasing temperature in a vacuum furnace under a first pressure which is less than 5 kPa and supplying a first gas comprising a first inert gas to the vacuum furnace; and
    a second step of heating the preform under an increasing temperature in the vacuum furnace under a second pressure which is less than 5 kPa in which a second gas comprising a second inert gas is supplied to the vacuum furnace, the second inert gas being supplied at a flow rate less than the first inert gas, or under a vacuum in which substantially no gas is supplied to the vacuum furnace.

2. The process for the consolidation according to claim 1, wherein a boundary between the first step and the second step is set at a temperature between 1100° C. and 1450° C.

3. The process for the consolidation according to claim 1, wherein the first pressure is not lower than 20 Pa.

4. The process for the consolidation according to claim 1, wherein the second pressure is not higher than 100 Pa.

5. The process for the consolidation according to claim 1, wherein the first or second pressure is adjusted by controlling a gas flow rate supplied to the vacuum furnace rather than by limiting an evacuation capacity of an evacuating means from the vacuum furnace.

6. The process for the consolidation according to claim 1, wherein the first pressure is five times or more as high as a total pressure of gases which are liberated from the preform and the vacuum furnace when the preform is being consolidated under a vacuum without any gas supply.

7. The process for the consolidation according to claim 1, wherein the first and second inert gasses are helium gas.

8. The process for the consolidation according to claim 7, wherein the vacuum furnace comprises a muffle tube and the helium gas is supplied to the outside of the muffle tube.

9. The process for the consolidation according to claim 7, wherein the vacuum furnace comprises a muffle tube and the helium gas is supplied to the outside and the inside of the muffle tube.

10. The process for the consolidation according to claim 1, wherein the first gas is helium gas and a halogen gas or helium and a halide gas, and the second gas is helium.

11. The process for the consolidation according to claim 10, wherein the halogen gas or the halide gas is supplied during only a part of the first step while the helium gas is supplied throughout the first step.

12. The process for the consolidation according to claim 11, wherein the first pressure in the vacuum furnace when the halogen gas or the halide gas is supplied is adjusted by controlling a gas flow rate of the helium gas and the halogen or the halide gas and an evacuation capacity of an evacuating means from the vacuum furnace, and the first pressure in the vacuum furnace when the halogen gas or the halide gas is not supplied is adjusted by controlling only a gas flow rate of the helium gas.

13. The process for the consolidation according to claim 10, wherein the vacuum furnace comprises a muffle tube and the halogen gas or the halide gas is supplied to the inside of the muffle tube and the helium gas is supplied to the outside of the muffle tube.

14. The process for the consolidation according to claim 10, wherein the vacuum furnace comprises a muffle tube and the halogen gas or the halide gas is supplied to the inside of the muffle tube and the helium gas is supplied to the inside and the outside of the muffle tube.

15. The process for the consolidation according to claim 1, wherein a gas flow rate of the first gas supplied to the furnace is reduced during a border between the first step and the second step gradually or stepwise and the second inert gas comprises the first inert gas.

16. The process for the consolidation of a porous glass preform for an optical fiber according to claim 1, wherein the second gas is supplied in an amount less than that of the first gas.

* * * * *